US009210173B2

(12) United States Patent
Ferris

(10) Patent No.: US 9,210,173 B2
(45) Date of Patent: Dec. 8, 2015

(54) SECURING APPLIANCES FOR USE IN A CLOUD COMPUTING ENVIRONMENT

(75) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 1088 days.

(21) Appl. No.: 12/324,563

(22) Filed: Nov. 26, 2008

(65) Prior Publication Data

US 2010/0132016 A1 May 27, 2010

(51) Int. Cl.
*G06F 7/04* (2006.01)
*G06F 15/16* (2006.01)
*G06F 17/30* (2006.01)
*H04L 29/06* (2006.01)
*G06F 12/00* (2006.01)
*G06F 12/14* (2006.01)
*G06F 13/00* (2006.01)
*G11C 7/00* (2006.01)
*G06F 21/62* (2013.01)

(52) U.S. Cl.
CPC .......... *H04L 63/101* (2013.01); *G06F 21/6218* (2013.01); *H04L 63/105* (2013.01); *H04L 65/1063* (2013.01)

(58) Field of Classification Search
CPC .............. H04L 63/105; H04L 65/1063; G06F 21/6218
USPC ....................................................... 726/21, 4
See application file for complete search history.

(56) References Cited

U.S. PATENT DOCUMENTS

| 6,367,077 | B1 | 4/2002 | Brodersen et al. |
| 6,393,569 | B1 * | 5/2002 | Orenshteyn ........................ 726/4 |
| 6,463,457 | B1 | 10/2002 | Armentrout et al. |
| 6,578,199 | B1 | 6/2003 | Tsou et al. |
| 7,140,028 | B2 | 11/2006 | Bentley et al. |
| 7,313,796 | B2 | 12/2007 | Hamilton et al. |
| 7,392,546 | B2 * | 6/2008 | Patrick ............................ 726/26 |
| 7,439,937 | B2 | 10/2008 | Ben-Shachar et al. |
| 7,461,095 | B2 | 12/2008 | Cohen et al. |
| 7,529,785 | B1 | 5/2009 | Spertus et al. |
| 7,546,462 | B2 | 6/2009 | Upton |
| 7,577,722 | B1 | 8/2009 | Khandekar et al. |
| 7,596,620 | B1 | 9/2009 | Colton et al. |
| 7,624,394 | B1 | 11/2009 | Christopher, Jr. |
| 7,793,288 | B2 | 9/2010 | Sameske |

(Continued)

OTHER PUBLICATIONS

Morgan, "Systems and Methods for Generating Optimized Resource Consumption Periods for Multiple Users on Combined Basis", U.S. Appl. No. 13/037,359, filed Mar. 1, 2011.

(Continued)

*Primary Examiner* — Evans Desrosiers
*Assistant Examiner* — Lawrence Cosby
(74) *Attorney, Agent, or Firm* — Lowenstein Sandler LLP

(57) ABSTRACT

An originator of an appliance can independently secure the appliance for instantiation in the cloud, separate from the security level of the cloud. The originator can secure the appliance utilizing a secure rights application. The secure rights application can be configured to "wrap" an appliance in a security container. The security container can limit access to the applications and operating systems contained in the appliance, but allow the appliance to operate normally once instantiated in the cloud. The secure rights application can be configured to cryptographically secure the appliance in order limit the ability of unauthorized parties from accessing the components of the appliance while maintaining the functionality of the appliance.

12 Claims, 5 Drawing Sheets

(56) References Cited

U.S. PATENT DOCUMENTS

| | | |
|---|---|---|
| 7,886,038 B2 | 2/2011 | Ferris |
| 8,108,912 B2 | 1/2012 | Ferris |
| 8,176,094 B2 | 5/2012 | Friedman |
| 8,201,144 B2 | 6/2012 | Rogers et al. |
| 8,239,509 B2 | 8/2012 | Ferris et al. |
| 8,458,658 B2 | 6/2013 | Faus et al. |
| 8,504,443 B2 | 8/2013 | Ferris et al. |
| 2001/0039497 A1 | 11/2001 | Hubbard |
| 2002/0069276 A1 | 6/2002 | Hino et al. |
| 2002/0086688 A1 | 7/2002 | Kang |
| 2002/0129352 A1 | 9/2002 | Brodersen et al. |
| 2002/0165819 A1 | 11/2002 | McKnight et al. |
| 2002/0188869 A1* | 12/2002 | Patrick ..................... 713/201 |
| 2003/0037258 A1 | 2/2003 | Koren |
| 2003/0110252 A1 | 6/2003 | Yang-Huffman |
| 2003/0121024 A1 | 6/2003 | Hill et al. |
| 2003/0135609 A1 | 7/2003 | Carlson et al. |
| 2004/0162902 A1 | 8/2004 | Davis |
| 2004/0177342 A1 | 9/2004 | Worley, Jr. |
| 2004/0181773 A1 | 9/2004 | Mortensen et al. |
| 2004/0210591 A1 | 10/2004 | Hirschfeld et al. |
| 2004/0210627 A1 | 10/2004 | Kroening |
| 2004/0268347 A1 | 12/2004 | Knauerhase et al. |
| 2005/0044541 A1 | 2/2005 | Parthasarathy et al. |
| 2005/0071847 A1 | 3/2005 | Bentley et al. |
| 2005/0131898 A1 | 6/2005 | Fatula |
| 2005/0144060 A1 | 6/2005 | Chen et al. |
| 2005/0149447 A1 | 7/2005 | Sherkow |
| 2005/0182727 A1 | 8/2005 | Robert et al. |
| 2005/0198628 A1 | 9/2005 | Graham et al. |
| 2005/0262549 A1* | 11/2005 | Ritt et al. ..................... 726/1 |
| 2005/0289540 A1 | 12/2005 | Nguyen et al. |
| 2006/0031598 A1 | 2/2006 | Blanchard et al. |
| 2006/0075042 A1 | 4/2006 | Wang et al. |
| 2006/0085530 A1* | 4/2006 | Garrett ..................... 709/223 |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2006/0277542 A1 | 12/2006 | Wipfel |
| 2007/0011291 A1 | 1/2007 | Mi et al. |
| 2007/0028001 A1 | 2/2007 | Phillips et al. |
| 2007/0074201 A1 | 3/2007 | Lee |
| 2007/0101116 A1 | 5/2007 | Tsuji |
| 2007/0105627 A1 | 5/2007 | Campbell |
| 2007/0150865 A1 | 6/2007 | Rajput |
| 2007/0168926 A1 | 7/2007 | Rajah et al. |
| 2007/0168962 A1 | 7/2007 | Heinke et al. |
| 2007/0169079 A1 | 7/2007 | Keller et al. |
| 2007/0226715 A1 | 9/2007 | Kimura et al. |
| 2007/0245332 A1 | 10/2007 | Tal et al. |
| 2007/0283282 A1 | 12/2007 | Bonfiglio et al. |
| 2007/0294676 A1 | 12/2007 | Mellor et al. |
| 2008/0022271 A1 | 1/2008 | D'Angelo et al. |
| 2008/0052384 A1 | 2/2008 | Marl et al. |
| 2008/0080396 A1 | 4/2008 | Meijer et al. |
| 2008/0080718 A1 | 4/2008 | Meijer et al. |
| 2008/0082538 A1* | 4/2008 | Meijer et al. ..................... 707/9 |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104393 A1* | 5/2008 | Glasser et al. ................. 713/165 |
| 2008/0104608 A1 | 5/2008 | Hyser et al. |
| 2008/0109876 A1* | 5/2008 | Hitomi et al. ..................... 726/2 |
| 2008/0127087 A1 | 5/2008 | Brookins et al. |
| 2008/0134178 A1* | 6/2008 | Fitzgerald et al. ................ 718/1 |
| 2008/0215796 A1* | 9/2008 | Lam et al. ..................... 711/100 |
| 2008/0240150 A1 | 10/2008 | Dias et al. |
| 2008/0256516 A1 | 10/2008 | Chaar et al. |
| 2009/0012885 A1 | 1/2009 | Cahn |
| 2009/0013061 A1 | 1/2009 | Winter et al. |
| 2009/0025006 A1 | 1/2009 | Waldspurger |
| 2009/0037496 A1 | 2/2009 | Chong et al. |
| 2009/0064086 A1 | 3/2009 | Faus |
| 2009/0089078 A1 | 4/2009 | Bursey |
| 2009/0089407 A1 | 4/2009 | Chalupa et al. |
| 2009/0089738 A1 | 4/2009 | Krueger et al. |
| 2009/0099940 A1 | 4/2009 | Frederick et al. |
| 2009/0132695 A1 | 5/2009 | Surtani et al. |
| 2009/0144718 A1 | 6/2009 | Boggs |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217263 A1 | 8/2009 | Gebhart et al. |
| 2009/0217267 A1 | 8/2009 | Gebhart et al. |
| 2009/0222805 A1 | 9/2009 | Faus |
| 2009/0222806 A1 | 9/2009 | Faus |
| 2009/0222808 A1 | 9/2009 | Faus |
| 2009/0228950 A1 | 9/2009 | Reed et al. |
| 2009/0248693 A1 | 10/2009 | Sagar et al. |
| 2009/0249279 A1 | 10/2009 | Bourdon |
| 2009/0249287 A1 | 10/2009 | Patrick |
| 2009/0249488 A1 | 10/2009 | Robinson et al. |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300164 A1 | 12/2009 | Boggs |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300584 A1 | 12/2009 | Faus |
| 2009/0300593 A1 | 12/2009 | Faus |
| 2009/0300601 A1 | 12/2009 | Faus |
| 2009/0300607 A1 | 12/2009 | Ferris et al. |
| 2009/0300608 A1 | 12/2009 | Ferris |
| 2009/0300635 A1 | 12/2009 | Ferris |
| 2009/0300641 A1 | 12/2009 | Friedman et al. |
| 2009/0300719 A1 | 12/2009 | Ferris |
| 2009/0327683 A1 | 12/2009 | Cabot et al. |
| 2010/0031234 A1 | 2/2010 | Chaar et al. |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0095270 A1 | 4/2010 | Seitz et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0217850 A1 | 8/2010 | Ferris |
| 2010/0217864 A1 | 8/2010 | Ferris |
| 2010/0217865 A1 | 8/2010 | Ferris |
| 2010/0218237 A1 | 8/2010 | Ferris |
| 2010/0220622 A1 | 9/2010 | Wei |
| 2010/0235482 A1 | 9/2010 | Chalupa et al. |
| 2010/0235813 A1 | 9/2010 | Manczak et al. |
| 2010/0299366 A1 | 11/2010 | Stienhans et al. |
| 2010/0306354 A1 | 12/2010 | DeHaan |
| 2010/0306377 A1 | 12/2010 | DeHaan |
| 2010/0306379 A1 | 12/2010 | Ferris |
| 2010/0306566 A1 | 12/2010 | DeHaan |
| 2010/0306765 A1 | 12/2010 | DeHaan |
| 2010/0306767 A1 | 12/2010 | DeHaan |
| 2011/0004676 A1 | 1/2011 | Kawato |
| 2011/0010420 A1 | 1/2011 | Kagitani |
| 2011/0016214 A1 | 1/2011 | Jackson |
| 2011/0055034 A1 | 3/2011 | Ferris |
| 2011/0055377 A1 | 3/2011 | DeHaan |
| 2011/0055378 A1 | 3/2011 | Ferris |

(56) References Cited

U.S. PATENT DOCUMENTS

| | | |
|---|---|---|
| 2011/0055396 A1 | 3/2011 | DeHaan |
| 2011/0055398 A1 | 3/2011 | DeHaan |
| 2011/0055588 A1 | 3/2011 | DeHaan |
| 2011/0107103 A1 | 5/2011 | DeHaan |
| 2011/0119651 A1 | 5/2011 | Utschig-Utschig et al. |
| 2011/0131134 A1 | 6/2011 | Ferris |
| 2011/0131306 A1 | 6/2011 | Ferris |
| 2011/0131315 A1 | 6/2011 | Ferris |
| 2011/0131316 A1 | 6/2011 | Ferris |
| 2011/0131335 A1 | 6/2011 | Spaltro et al. |
| 2011/0131499 A1 | 6/2011 | Ferris |
| 2011/0167408 A1 | 7/2011 | Harmon |
| 2011/0213686 A1 | 9/2011 | Ferris |
| 2011/0213687 A1 | 9/2011 | Ferris |
| 2011/0213691 A1 | 9/2011 | Ferris |
| 2011/0213713 A1 | 9/2011 | Ferris |
| 2011/0213719 A1 | 9/2011 | Ferris |
| 2011/0213875 A1 | 9/2011 | Ferris |
| 2011/0213884 A1 | 9/2011 | Ferris |
| 2011/0214124 A1 | 9/2011 | Ferris |
| 2011/0239190 A1 | 9/2011 | Mueller et al. |
| 2012/0246639 A1 | 9/2012 | Kashyap et al. |
| 2012/0260229 A1 | 10/2012 | Peraza et al. |

OTHER PUBLICATIONS

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

"rBuilder and the rPath Appliance Platform", 2007 rPath, Inc., www.rpath.com, 3 pages.

White Paper—"rPath Versus Other Software Appliance Approaches", Mar. 2008, rPath, Inc., www.rpath.com, 9 pages.

White Paper—"Best Practices for Building Virtual Appliances", 2008 rPath, Inc., www.rpath.com, 6 pages.

Ferris, "Methods and Systems for Providing a Market for User-Controlled Resources to be Provided to a Cloud Computing Environment", U.S. Appl. No. 12/390,617, filed Feb. 23, 2009.

Ferris, "Methods and Systems for Communicating with Third Party Resources in a Cloud Computing Environment", U.S. Appl. No. 12/390,598, filed Feb. 23, 2009.

Ferris, "Systems and Methods for Extending Security Platforms to Cloud-Based Networks", U.S. Appl. No. 12/391,802, filed Feb. 24, 2009.

DeHaan et al., "Methods and Systems for Flexible Cloud Management", U.S. Appl. No. 12/473,041, filed May 27, 2009.

Ferris, "Methods and Systems for Providing a Universal Marketplace for Resources for Delivery to a Cloud Computing Environment", U.S. Appl. No. 12/475,228, filed May 29, 2009.

DeHaan et al., "Systems and Methods for Power Management in Managed Network Having Hardware-Based and Virtual Reources", U.S. Appl. No. 12/475,448, filed May 29, 2009.

DeHaan et al., "Methods and Systems for Flexible Cloud Management with Power Management Support", U.S. Appl. No. 12/473,987, filed May 28, 2009.

DeHaan, "Methods and Systems for Automated Scaling of Cloud Computing Systems", U.S. Appl. No. 12/474,707, filed May 29, 2009.

DeHaan, "Methods and Systems for Securely Terminating Processes in a Cloud Computing Environment", U.S. Appl. No. 12/550,157, filed Aug. 28, 2009.

DeHaan, "Methods and Systems for Flexible Cloud Management Including External Clouds", U.S. Appl. No. 12/551,506, filed Aug. 31, 2009.

DeHaan, "Methods and Systems for Abstracting Cloud Management to Allow Communication Between Independently Controlled Clouds", U.S. Appl. No. 12/551,096, filed Aug. 31, 2009.

DeHaan, "Methods and Systems for Automated Migration of Cloud Processes to External Clouds", U.S. Appl. No. 12/551,459, filed Aug. 31, 2009.

Ferris, "Methods and Systems for Pricing Software Infrastructure for a Cloud Computing Environment", U.S. Appl. No. 12/551,517, filed Aug. 31, 2009.

Ferris et al., "Methods and Systems for Metering Software Infrastructure in a Cloud Computing Environment", U.S. Appl. No. 12/551,514, filed Aug. 31, 2009.

DeHaan et al., "Systems and Methods for Secure Distributed Storage", U.S. Appl. No. 12/610,081, filed Oct. 30, 2009.

Ferris et al., "Methods and Systems for Monitoring Cloud Computing Environment", U.S. Appl. No. 12/627,764, filed Nov. 30, 2009.

Ferris et al., "Methods and Systems for Detecting Events in Cloud Computing Environments and Performing Actions Upon Occurrence of the events", U.S. Appl. No. 12/627,646, filed Nov. 30, 2009.

Ferris et al., "Methods and Systems for Verifying Software License Compliance in Cloud Computing Environments", U.S. Appl. No. 12/627,643, filed Nov. 30, 2009.

Ferris et al., "System and Methods for Service Aggregation Using Graduated Service Levels in a Cloud Network", U.S. Appl. No. 12/628,112, filed Nov. 30, 2009.

Ferris et al., "Methods and Systems for Generating a Software License Knowledge Base for Verifying Software License Compliance in Cloud Computing Environments", U.S. Appl. No. 12/628,156, filed Nov. 30, 2009.

Ferris et al., "Methods and Systems for Converting Standard Software Licenses for Use in Cloud Computing Environments", U.S. Appl. No. 12/714,099, filed Feb. 26, 2010.

Ferris et al., "Systems and Methods for Managing a Software Subscription in a Cloud Network", U.S. Appl. No. 12/714,096, filed Feb. 26, 2010.

Ferris et al., "Methods and Systems for Providing Deployment Architectures in Cloud Computing Environments", U.S. Appl. No. 12/714,427, filed Feb. 26, 2010.

Ferris et al., "Methods and Systems for Matching Resource Requests with Cloud Computing Environments", U.S. Appl. No. 12/714,113, filed Feb. 26, 2010.

Ferris et al., "Systems and Methods for Generating Cross-Cloud Computing Appliances", U.S. Appl. No. 12/714,315, filed Feb. 26, 2010.

Ferris et al., "Systems and Methods for Cloud-Based Brokerage Exchange of Software Entitlements", U.S. Appl. No. 12/714,302, filed Feb. 26, 2010.

Ferris et al., "Methods and Systems for Offering Additional License Terms During Conversion of Standard Software Licenses for Use in Cloud Computing Environments", U.S. Appl. No. 12/714,065, filed Feb. 26, 2010.

Ferris et al., "Systems and Methods for or a Usage Manager for Cross-Cloud Appliances", U.S. Appl. No. 12/714,334, filed Feb. 26, 2010.

Ferris et al., "Systems and Methods for Delivery of User-Controlled Resources in Cloud Environments Via A Resource Specification Language Wrapper", U.S. Appl. No. 12/790,294, filed May 28, 2010.

Ferris et al., "Systems and Methods for Managing Multi-Level Service Level Agreements in Cloud-Based Networks", U.S. Appl. No. 12/789,660, filed May 28, 2010.

Ferris et al., "Methods and Systems for Generating Cross-Mapping of Vendor Software in a Cloud Computing Environment", U.S. Appl. No. 12/790,527, filed May 28, 2010.

Ferris et al., "Methods and Systems for Cloud Deployment Analysis Featuring Relative Cloud Resource Importance", U.S. Appl. No. 12/790,366, filed May 28, 2010.

Ferris et al., "Systems and Methods for Generating Customized Build Options for Cloud Deployment Matching Usage Profile Against Cloud Infrastructure Options", U.S. Appl. No. 12/789,701, filed May 28, 2010.

Ferris et al., "Systems and Methods for Exporting Usage History Data as Input to a Management Platform of a Target Cloud-Based Network", U.S. Appl. No. 12/790,415, filed May 28, 2010.

Ferris et al., "Systems and Methods for Cross-Vendor Mapping Service in Cloud Networks", U.S. Appl. No. 12/790,162, filed May 28, 2010.

(56) References Cited

OTHER PUBLICATIONS

Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
DeHaan, "Methods and Systems for Abstracting Cloud Management", U.S. Appl. No. 12/474,113, filed May 28, 2009.
Ferris, et al., "Systems and Methods for Cominatorial Optimization of Multiple Resources Across a Set of Cloud-Based Networks", U.S. Appl. No. 12/953,718, filed Nov. 24, 2010.
Ferris et al., "Systems and Methods for Matching a Usage History to a New Cloud", U.S. Appl. No. 12/953,757, filed Nov. 24, 2010.
Ferns et al., "Systems and Methods for Identifying Usage Histories for Producing Optimized Cloud Utilization", U.S. Appl. No. 12/952,930, filed Nov. 23, 2010.
Ferris et al., "Systems and Methods for Identifying Service Dependencies in a Cloud Deployment", U.S. Appl. No. 12/952,857, filed Nov. 23, 2010.
Ferris et al., "Systems and Methods for Migrating Subscribed Services in a Cloud Deployment", U.S. Appl. No. 12/955,277, filed Nov. 29, 2010.
Ferris et al., "Systems and Methods for Migrating Subscribed Services from a Set of Clouds to a Second Set of Clouds", U.S. Appl. No. 12/957,281, filed Nov. 30, 2010.
Morgan, "Systems and Methods for Generating Multi-Cloud Incremental Billing Capture and Administration", U.S. Appl. No. 12/954,323, filed Nov. 24, 2010.
Morgan, "Systems and Methods for Aggregating Marginal Subscription Offsets in a Set of Multiple Host Clouds", U.S. Appl. No. 12/954,400, filed Nov. 24, 2010.
Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.
Morgan, "Systems and Methods for Managing Subscribed Resource Limits in Cloud Network Using Variable or Instantaneous Consumption Tracking Periods", U.S. Appl. No. 12/954,352, filed Nov. 24, 2010.
Ferris et al., "Systems and Methods for Migrating Software Modules into One or More Clouds", U.S. Appl. No. 12/952,701, filed Nov. 23, 2010.
Ferris et al., "Systems and Methods for Brokering Optimized Resource Supply Costs in Host Cloud-Based Network Using Predictive Workloads", U.S. Appl. No. 12/957,274, filed Nov. 30, 2010.
Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.
Morgan, "Systems and Methods for Detecting Resource Consumption Events Over Sliding Intervals in Cloud-Based Network", U.S. Appl. No. 13/149,235, filed May 31, 2011.
Morgan, "Systems and Methods for Triggering Workload Movement Based on Policy Stack Having Multiple Selectable Inputs", U.S. Appl. No. 13/149,418, filed May 31, 2011.
Morgan, "Systems and Methods for Cloud Deployment Engine for Selective Workload Migration or Federation Based on Workload Conditions", U.S. Appl. No. 13/117,937, filed May 27, 2011.
Morgan, "Systems and Methods for Tracking Cloud installation Information Using Cloud-Aware Kernel of Operating system", U.S. Appl. No. 13/149,750, filed May 31, 2011.
Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System Installation in Cloud-Based Network", U.S. Appl. No. 13/149,877, filed May 31, 2011.
Red Hat, Inc. Office Action for U.S. Appl. No. 12/551,517, mailed Dec. 21, 2011.
Red Hat, Inc. Office Action for U.S. Appl. No. 12/040,831, mailed Aug. 22, 2011.
Red Hat, Inc. Office Action for U.S. Appl. No. 12/040,831, mailed Jan. 24, 2012.
Red Hat, Inc. Office Action for U.S. Appl. No. 12/128,787, mailed Mar. 4, 2010.
Red Hat, Inc. Final Office Action for U.S. Appl. No. 12/128,787, mailed Nov. 8, 2010.
Red Hat, Inc. Office Action for U.S. Appl. No. 12/128,787, mailed Aug. 1, 2011.
Red Hat, Inc. Advisory Action for U.S. Appl. No. 12/128,787, mailed Jan. 20, 2011.
Red Hat, Inc. Final Office Action for U.S. Appl. No. 12/128,787, mailed Nov. 22, 2011.
Red Hat, Inc. Office Action for U.S. Appl. No. 12/040,831 mailed Jul. 5, 2012.
Red Hat, Inc. Office Action for U.S. Appl. No. 12/040,831 mailed Nov. 1, 2012.
Notice of Allowance for U.S. Appl. No. 12/040,831 mailed Feb. 5, 2013.
Red Hat, Inc. Office Action for U.S. Appl. No. 12/128,787 mailed May 24, 2012.
Red Hat, Inc. Office Action for U.S. Appl. No. 12/128,787 mailed Sep. 14, 2012.
USPTO, Advisory Action for U.S. Appl. No. 12/128,787 mailed Dec. 4, 2012.
Red Hat, Inc. Office Action for U.S. Appl. No. 12/551,517 mailed Jul. 23, 2012.
Notice of Allowance for U.S. Appl. No. 12/551,517 mailed Mar. 29, 2013.
USPTO, Advisory Action for U.S. Appl. No. 12/551,517 mailed Oct. 11, 2012.
USPTO, Notice of Allowance for U.S. Appl. No. 12/551,517 mailed Mar. 29, 2013.
Liu, Huan; "Rapid Application Configuration in Amazon Cloud using Configurable Virtual Appliances", 2011 ACM, SAC'11 Mar. 21-15, 2011, Taiwan, pp. 147-154; <http://dl.acm.org/citation.cfm?id+1982185.1982221&coll=DL&dl=GUIDE&CFID=268649706&CFTOKEN=27442775>.
Robison, D. "Billing simulation tool for commercial buildings;" Nov. 7, 2001; Fairmont Press Inc., Strategic Planning for Energy and the Environment, Fall 2001, vol. 21, No. 2, pp. 47-65.
VMware, "Best Practices for Buildign Virtual Appliances", 2007 VMware, Inc. pp. 1-7; <http://www.vmware.come/files/pdf/Best_Practices_Building_Virtual_Appliances_pdf>.
VMware, "User's Guide to Deploying vApps and Virtual Appliances", 2010 VMware, pp. 1-28.
VMware, "Virtual Appliances: A New Paradigm for Software Delivery," 2008 VMware, Inc., pp. 1-14; <http://www.vmware.com/files/pdf/vam/VMware_Virtual_Appliance_Solutions_White_Paper_08Q3.pdf>.
Wies et al., "Customizable Pervasive Application", 2006 IEEE, PERCOM'06, pp. 1-6; <http://ieeexplore.ieee.org/stamp/stamp.jsp?tp=&arnumber=1604813>.
USPTO, Office Action for U.S. Appl. No. 12/128,787 mailed Mar. 24, 2014.
USPTO, Final Office Action for U.S. Appl. No. 12/128,787 mailed Sep. 30, 2014.

\* cited by examiner

SECURING APPLIANCES FOR USE IN A CLOUD COMPUTING ENVIRONMENT

FIELD

This invention relates generally to products and services, more particularly, to systems and methods for cloud computing related services and products.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

In the cloud computing environment, the resources used by the cloud may not be under the direct control of the owner or operator of the cloud. The cloud may utilize third party computing systems in the cloud's pool of resources for hosting applications and appliances. As such, the owner and operator of the cloud cannot guarantee or control the security of applications and appliances running on the third party systems. In turn, the users submitting applications and appliances to the cloud may be wary of using the cloud computing environment due to possible security concerns.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
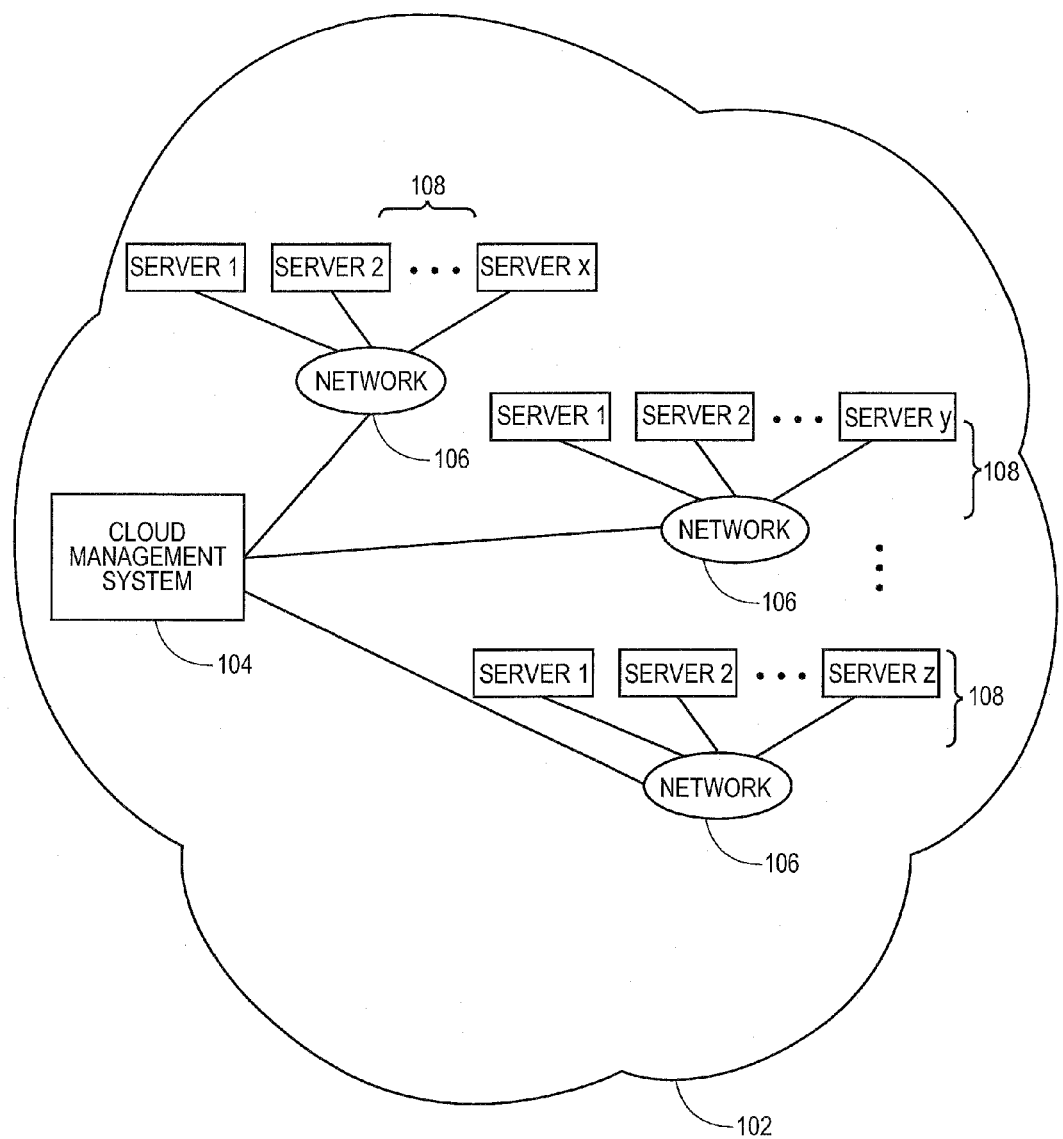
FIG. 1 illustrates an overall cloud system architecture in which various embodiments of the present teachings can be practiced.

For simplicity and illustrative purposes, the principles of the present invention are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for securing appliances in a cloud computing environment. More particularly, embodiments relate to platforms and techniques in which originators can secure appliances with rights management while maintaining the ability of the appliances to operate in a cloud computing environment.

A cloud computing environment can utilize resources deemed to be both secure and insecure (e.g. resources under the control of the cloud and resources provided by independent third parties). According to embodiments, an originator of an appliance can independently secure the appliance for instantiation in the cloud, separate from the security level of the cloud. To achieve this, the originator can secure the appliance utilizing a secure rights application.

According to embodiments, the secure rights application can be configured to "wrap" an appliance in a security container. The security container can limit access to the applications and operating systems contained in the appliance, but allow the appliance to operate normally once instantiated in the cloud. The secure rights application can be configured to cryptographically secure the appliance in order limit the ability of unauthorized parties from accessing the components of the appliance while maintaining the functionality of the appliance. The secure rights application can be configured to associate access to the components of the appliance with an access record. The access record defines users allowed to access the component of the application, the level of access the users possess, and the authentication information for the users.

According to embodiments, once the appliance is wrapped in the security container, the security container can be configured to authenticate a particular user requesting access to the components of the appliance. The security container can be configured to receive authentication information from the particular user and grant access to the components of the appliance deemed accessible to the particular user. The security container can be configured to communicate with an authentication server in order to verify the authentication information and determine the access rights of the particular user. The authentication server can be maintained by the originator of the appliance or by an independent and trusted authority.

By allowing an originator to secure appliances before distribution to the cloud, the originator can control and manage access to the components of the appliance. As such, the originator can utilize the cloud computing environment without concern for the security of the clouds or resources supporting the appliance.

FIG. 1 illustrates an overall cloud computing environment, in which systems and methods for the management of subscriptions of cloud-based virtual machines can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines can be managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, because the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select a group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set of resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in a set of resource servers 108 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
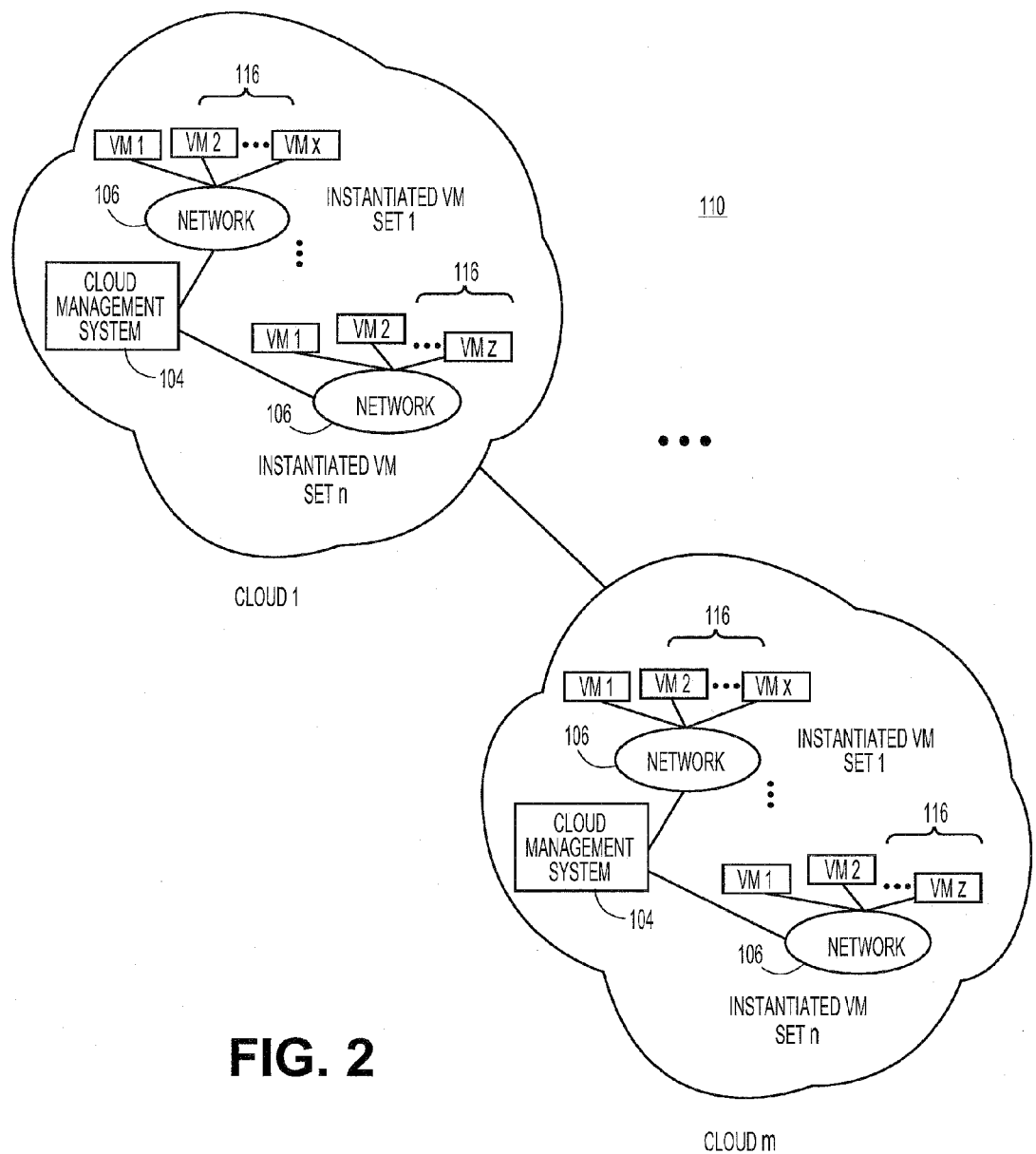
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other number of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
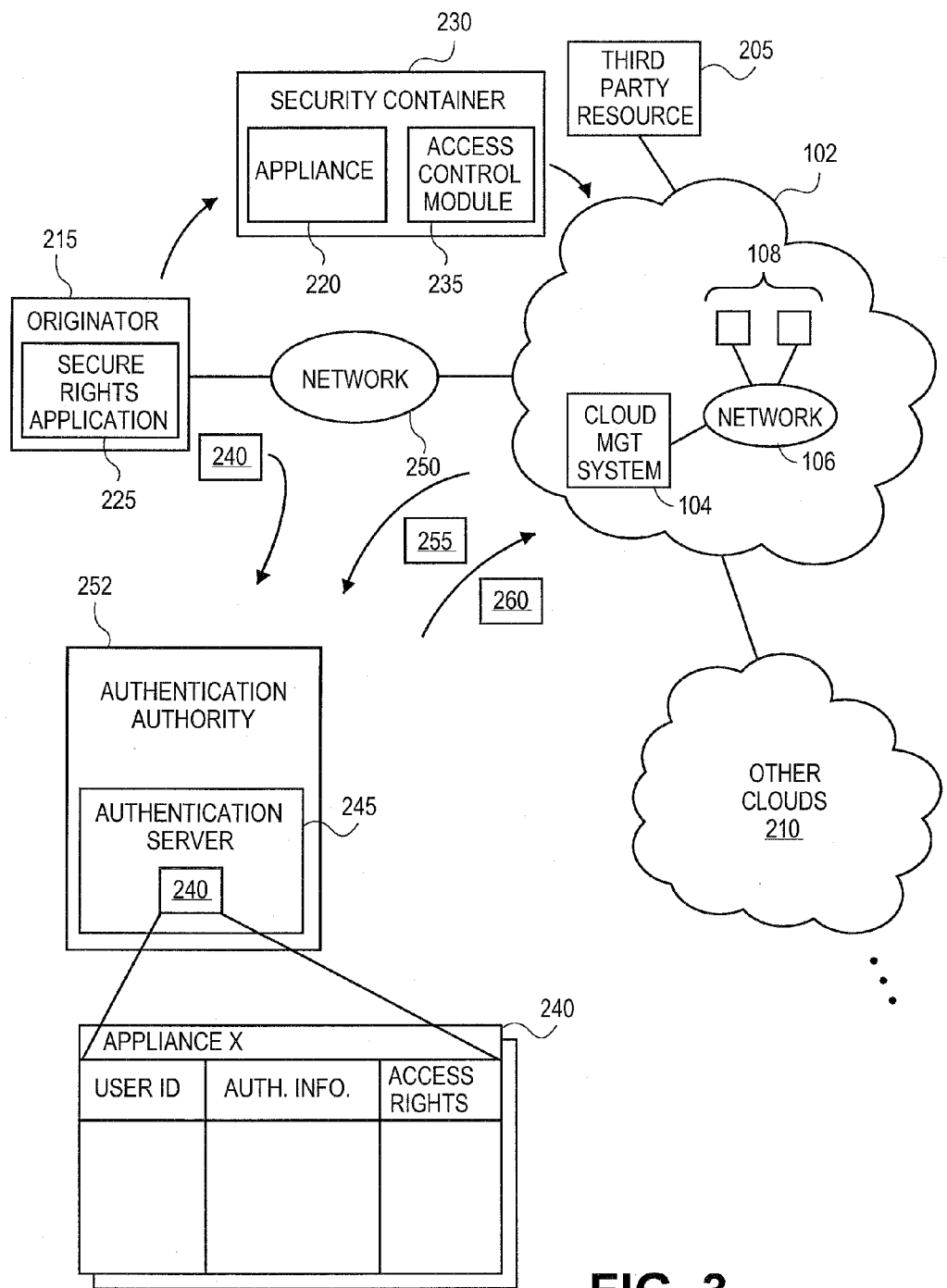
FIG. 3 illustrates an overall cloud system architecture in which users can secure appliances, according to various embodiments.

FIG. 3 illustrates aspects of a cloud computing environment in which originators of appliances can secure the appliances for use in the environment, according to various embodiments. In embodiments, as shown, the cloud computing environment can include a cloud 102 as described above. As described above, the cloud 102 can include a set of resources for instantiating virtual machines, applications, appliances, and the like. The cloud 102 can also utilize external resources such as third party resources 205 and other clouds 210. For example, the third party resources 205 can be any type of computer system under the control of a user, independent of the owner or operator of the cloud 102, such as one or more personal computers (desktop, laptop, etc.), one or more server computers, and the like, which are under the control of individuals, companies, and the like. The cloud management system 104 can be configured to contact, request, and include the third party resources 205 and resources from other clouds 210 in the pool of resources provide by the cloud 102. Because the cloud 102 does not control the third party resources 205 and resources from the other clouds 210, the cloud 102 may not be able to guarantee the security of these resources.

According to embodiments, an originator 215 can desire to instantiate an appliance 220 in the cloud 102. Originator 215 may not be assured of the security of appliance 220 being instantiated in the cloud 102. For example, due to resource availability, the cloud 102 may instantiate the appliance 220 in the third party resources 205 or the other clouds 210. As such, third parties may have access to the appliance 220.

According to embodiments, the originator 215 can independently secure the appliance 220 for instantiation in the cloud 102, separate from the security level of the cloud 102. To achieve this, the originator 215 can secure the appliance 200 utilizing a secure rights application 225. The secure rights application 225 can be configured to "wrap" the appliance 220 in a security container 230. The security container 230 can be configured to limit access to the components contained in the appliance 220, but allow the appliance 220 to operate normally once instantiated in the cloud 102.

According to embodiments, the appliance 220 can include one or more software modules implementing an application combined with a "minimum amount of an operating system" (MiniOS) to allow the software modules to run on virtual machines or resources executing in the cloud 102. The appliance 220 can be any type of software appliance such as those described in co-pending U.S. patent application Ser. No. 12/040,831 filed Feb. 29, 2008 (U.S. Patent Application Publication No. 2009/0222805, published on Sep. 3, 2009), assigned to Red Hat Corporation, entitled "METHODS AND SYSTEMS FOR DYNAMICALLY BUILDING A SOFTWARE APPLIANCE", the entirety of which is incorporated herein by reference. While described above as containing an operating system, the appliance 220 can include one or more software modules without the OS included in the appliance.

As such, the appliance can include the necessary logic (APIs) to communicate with the execution platform of the cloud 102.

According to embodiments, the secure rights application 225 can be configured to cryptographically secure the appliance 220 in order limit the ability of unauthorized parties from accessing the components of the appliance while maintaining the functionality of the appliance 220. As such, the secure rights application 225 can be configured to generate the security container 230 around the appliance 220 and to apply the security container 230 to the appliance 220. The security container 230 represents security protocols applied to the components of the appliance 220 as well as the access control protocols and rights management protocols for accessing the components of the appliance 220.

The secure rights application 225 can be configured to include the necessary logic to perform any known security protocols in order to provide secure access to the appliance 220 and establish access rights for users. The secure rights application 225 can be configured to apply authentication protocols (secure login, passwords checks, digital signatures authentication, digital certificate authentication, etc), encryption protocols (symmetric cryptography, asymmetric cryptography, etc.), and the like to the appliance 220. For example, the secure rights application 225 can be configured to encrypt portions of the components of the appliance 220 and/or to apply authentication and access control protocols to the components of the appliance 220. The secure rights application 225 can be configured to generate and include, with the appliance 220, an access control module 235. The access control module 235 can be configured to operate as the access gateway to the appliance 220.

According to embodiments, the access control module 235 can be configured to grant access, to certain users, to the components of the appliance 220. The access control module 235 can be configured to allow the appliance 220 to operate normally according to the functionality of the appliance 220 while limiting access to access and modify the components of the appliance 220. The access control module 235 can be configured to include logic (commands, instruction, programming, APIs and the like) to communicate with the components of the appliance 220 to grant access to the components and carry out the functionality of the appliance 220. The access control module 235 can be configured to perform authentication (secure login, passwords checks, digital signatures authentication, digital certificate authentication, etc), encryption (symmetric cryptography, asymmetric cryptography, etc.), and the like. For example, the access control module 235 can be configured to decrypt any components of the appliance 220 in response to a valid request for access. Likewise, the access control module 235 can be configured to communicate with the OS of the appliance 220 to control access to the components of the appliance 220.

For example, the appliance 220 can be configured to include a content server and necessary OS to function as a web storefront when instantiated in the cloud 102. As such, the secure rights application 225 can be configured to generate the security container 230 and the access control module 235 that allows the appliance 220 to operate as a web storefront but limit access to the content server and OS to certain users. For example, the access control module 235 can be configured to allow all requests for content, via the APIs of the content server, during the operation of the appliance 220. Likewise, the access control module 235 can be configured to limit the ability to modify the settings and parameters of the content server and OS to certain users.

According to embodiments, the secure rights application 225 can be configured to set different levels of access for different users. The levels of access can be set by the originator 215. For example, the originator 215 can be enabled to access and perform all operations associated with the appliance 220 (e.g. modifying the application and OS, adding new applications and OS, removing applications and OS, configuring applications and OS). Whereas, the cloud management system 104 can be granted limited access to the components of the appliance 220, for example, only enough access to configure the applications and OS to operate properly in the cloud 102.

According to embodiments, the secure rights application 225 can be configured to associate access to the components of the appliance 220 with an access record 240. The access record 240 can be configured as any data structure capable of storing the information necessary to provide access control to the appliance 220. For example, the access record 240 can include information such as identification of users allowed to access the components of the application, the level of access the users possess, and authentication information for the users.

According to embodiments, once secured, the originator 215 can be configured to provide the appliance 220 to the cloud 102. The originator 215 can be configured to provide the appliance via a network 250. The network 250 can be any type of network, such as the Internet or other public or private network, including network 106. The originator 215 can provide the appliance 220 utilizing the secure rights application 225 or any other combination of software and hardware of the originator 215.

According to embodiments, once the appliance 220 is wrapped in the security container 230, the security container 230 can be configured to authenticate a particular user requesting access to the components of the appliance 220 via the access control module 235. The access control module 235 can be configured to receive authentication information from the particular user and grant access to the components of the appliance 220 deemed accessible to the particular user. To achieve this, the access control module 235 can be configured to communicate with an authentication server 245 in order to verify the authentication information and determine the access rights of the particular user. For example, the access control module 235 can be configured to transmit a verification request 255 via the network 250. The verification request 255 can include the authentication information of the requesting user and an identification of the appliance 220.

According to embodiments, the authentication server 245 can be configured to receive the verification request 255 from the access control module 235 and to verify the authentication information with information contained in the access record 240. For example, the authentication server 245 can be configured to search for the user's identification in the access record 240, compare the authentication information with the information stored for the user, and retrieve the access rights of the user. Once verified, the authentication server 245 can be configured to send a verification response 260 back to the access control module 235. The verification response 260 can include an indication if the user is allowed to access the components of the appliance, and, if so, what access level does the user possess.

According to embodiments, once the verification response 260 is received, the access control module 235 can be configured to grant access to the appliance based on the verification response 260. For example, the access control module 235 can examine the verification response 260 for the indication that the user is allowed access and grant access based on the access level contained in the verification response 260.

According to embodiments, as illustrated, the authentication server 245 can be maintained by an independent authentication authority 252. The authentication authority 252 can be configured to include the necessary hardware and software to perform the verification as described above. Likewise, the authentication server 245 can be maintained by the originator 215. Additionally, the authentication server 245 may be a component of the secure rights application 225. One skilled in the art will realize that any entity trusted by the originator 215 can maintain the authentication server 245.

Figure 4:
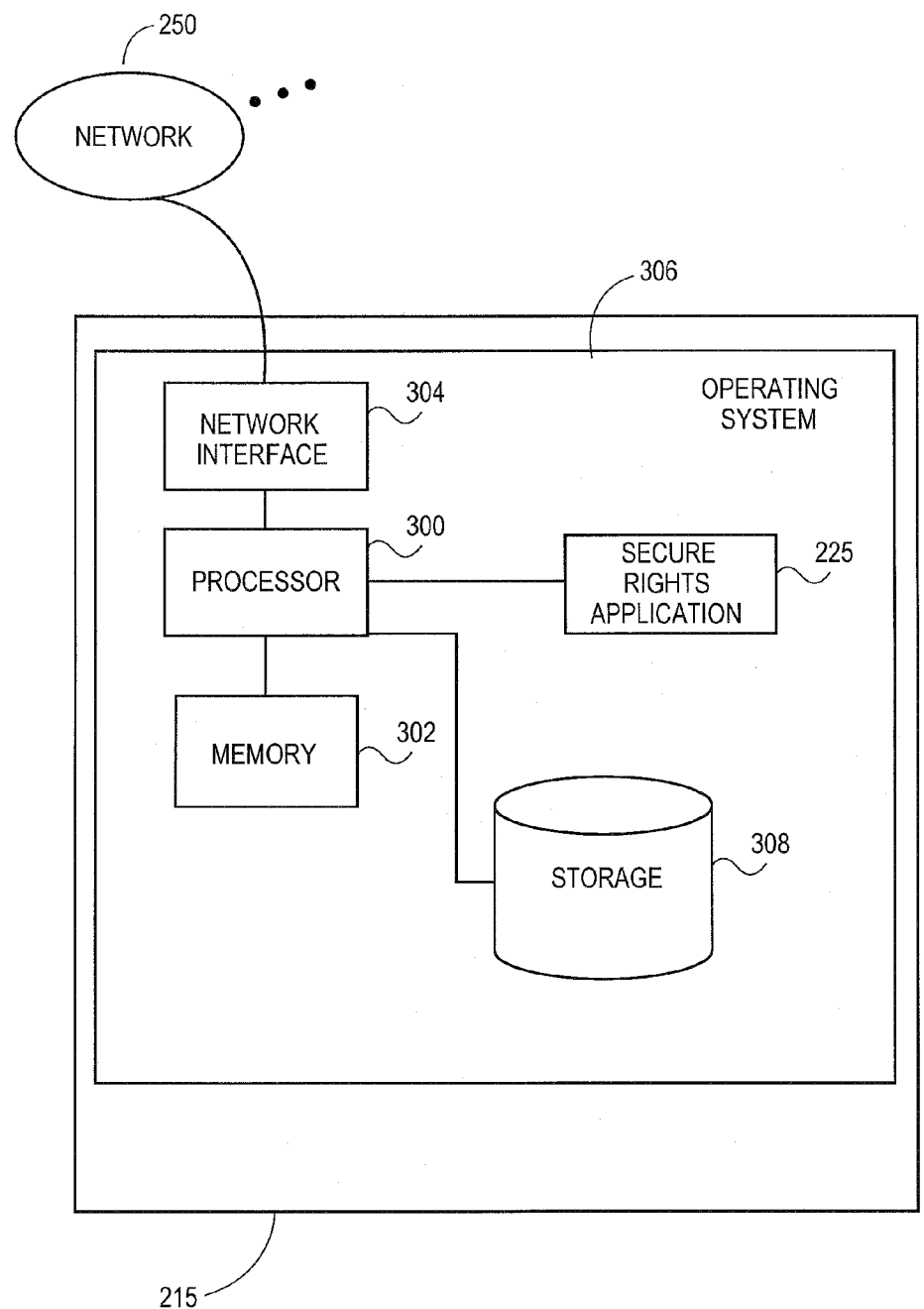
FIG. 4 illustrates an exemplary hardware configuration for a computer system for securing appliances for use in a cloud computing environment, according to various embodiments.

FIG. 4 illustrates an exemplary diagram of hardware and other resources that can be incorporated in the originator 215 and configured to communicate with the cloud 102 and the cloud management system 104 via one or more networks 250, according to embodiments. In embodiments as shown, the originator 215 can comprise a processor 300 communicating with memory 302, such as electronic random access memory, operating under control of or in conjunction with operating system 306. Operating system 306 can be, for example, a distribution of the Linux™ operating system including access control features, such as SELinux, the Unix™ operating system, or other open-source or proprietary operating system or platform. Processor 300 also communicates with one or more storage device 308, such as hard drives, optical storage, and the like, capable of storing the secure rights application 225. Processor 300 further communicates with network interface 304, such as an Ethernet or wireless data connection, which in turn communicates with one or more networks 250, such as the Internet or other public or private networks.

Processor 300 also communicates with the secure rights application 225, to execute control logic and allow the originator 215 to secure the appliance 220 as described above and below. For example, the secure rights application 225 can operate in conjunction with OS 306 to allow a user to configure and generate the security container 230 and the access control module 235. Other configurations of the originator, associated network connections, and other hardware and software resources are possible.

While FIG. 4 illustrates the originator 215 as a standalone system including a combination of hardware and software, the originator 215 can include multiple systems operating in cooperation. The secure rights application 225 can be implemented as a software application or program capable of being executed by the originator 215, as illustrated, or other conventional computer platforms. Likewise, the secure rights application 225 can also be implemented as a software module or program module capable of being incorporated in other software applications and programs. In either case, the secure rights application 225 can be implemented in any type of conventional proprietary or open-source computer language.

Additionally, the authentication server 245 can be implemented in the originator 215 as illustrated in FIG. 4. As such, the processor 300 can also communicate with the authentication server 245, to execute control logic and allow access to the appliance 220 as described above and below. Additionally, the access record 240 can be maintained in the storage device 308.

Figure 5:
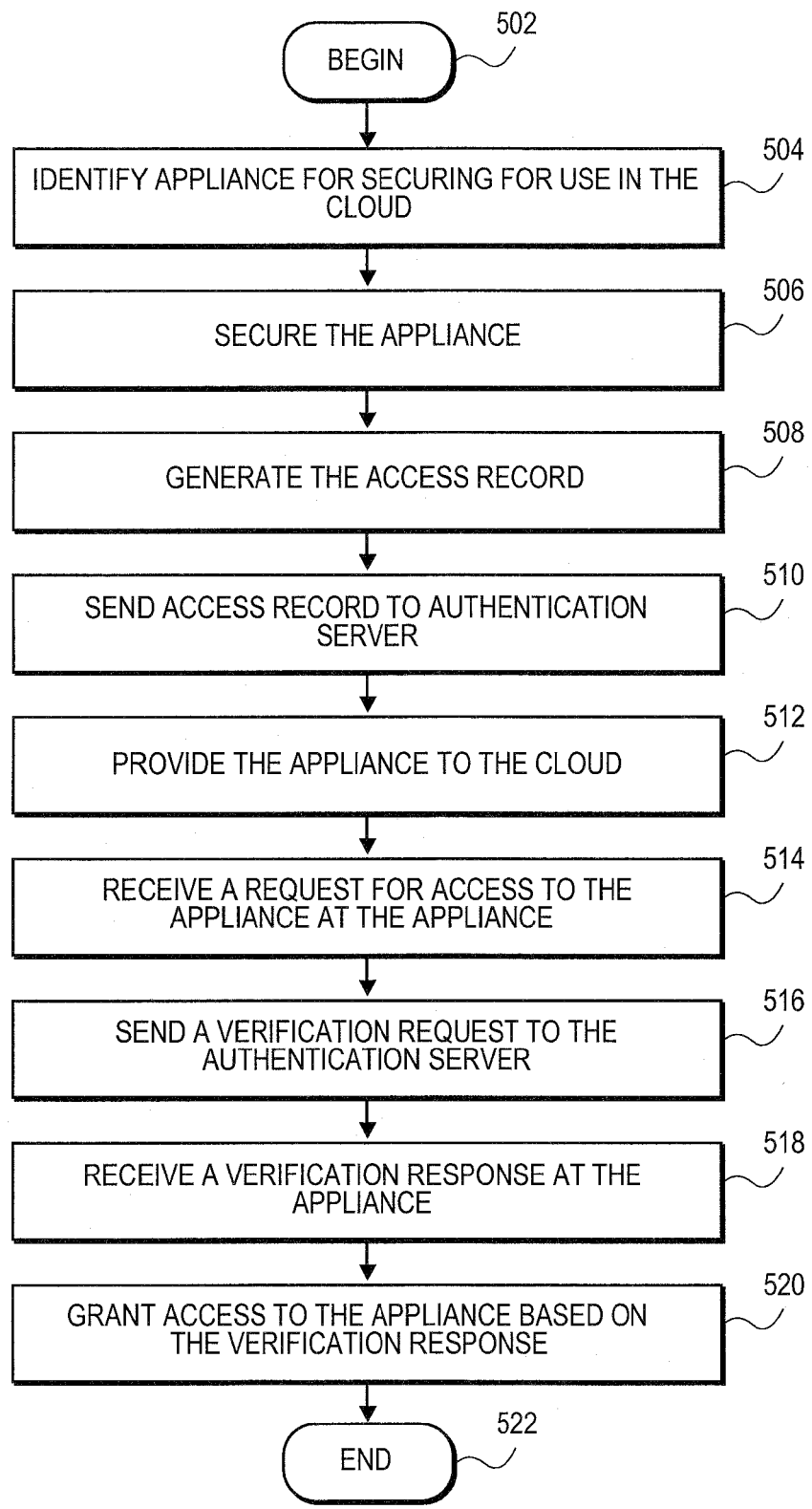
FIG. 5 illustrates a flowchart for securing appliances in a cloud computing environment, according to various embodiments.

FIG. 5 illustrates a flow diagram for securing an appliance in a cloud computing environment, according to embodiments. In 502, processing can begin. In 504, an appliance 220 can be identified as needing to be secured for use in the the cloud 102. For example, the originator 215 can utilize the secure rights application 225 to select an appliance 220 for securing and providing access control. Likewise, the secure rights application 225 can be configured to automatically secure the appliance 220 once built.

In 506, the secure rights application 225 can secure the appliance 220. The secure rights application 225 can generate the security container 230 and access control module 235 for the appliance 220. The security container 230 represents security protocols applied to the components of the appliance 220 as well as the access control protocols and rights management protocols for accessing the components of the appliance 220. For example, the secure rights application 225 can be configured to apply authentication protocols (secure login, passwords checks, digital signatures authentication, digital certificate authentication, etc), encryption protocols (symmetric cryptography, asymmetric cryptography, etc.), and the like to the appliance 220. The secure rights application 225 can be configured to encrypt portions of the components of the appliance 220 and/or to apply authentication and access control protocols to the components of the appliance 220.

The access control module 235 can be configured to allow the appliance 220 to operate normally according to the functionality of the appliance 220 while limiting the ability to access and modify the components of the appliance 220. For example, the access control module 235 can be configured to perform authentication (secure login, passwords checks, digital signatures authentication, digital certificate authentication, etc), encryption (symmetric cryptography, asymmetric cryptography, etc.), and the like. For example, the access control module 235 can be configured to decrypt any components of the appliance 220 in response to a valid request for access. Likewise, the access control module 235 can be configured to communicate with the OS of the appliance 220 to control access to the components of the appliance 220.

In 508, the secure rights application 225 can generate the access record for the appliance 220. The access record 240 can be configured as any data structure capable of storing the information necessary to provide access control to the appliance 220. For example, the access record 240 can include information such as identification of users allowed to access the component of the application, the level of access the users possess, and the authentication information for the users.

In 510, the secure rights application 225 can be configured to send the access record 240 to the authentication server 245. If the authentication server 245 is separate from the originator 215, the secure rights application 225 can be configured to transmit the access record 240 via network 250. If the authentication server 245 is located at the originator 215 or a part of the secure rights application 225, the secure rights application 225 can be configured to transfer the access record 240 to the authentication server 245 or provide the authentication server 245 with a reference to the access record 240.

In 512, the originator 215 can provide the appliance to the cloud 102. For example, the secure rights application 225 can be configured to communicate with the cloud 102, e.g. the cloud management system 104, to deliver the appliance 220. Likewise, the originator 215 can provide the appliance 220 to the cloud 102, via network 250, utilizing any combination of hardware and/or software.

In 514, once in the cloud 102, the appliance 220 receives a request for access to the appliance 220. For example, the request can be received by the access control module 235. The request can be received from any entity associated with or in communication with the cloud 102. The request can include the authentication information of the user requesting access.

In 516, the appliance 220 sends a verification request 255 to the authentication server 245. For example, the access control module 235 can send a verification request 255 to the authentication server that includes the authentication information of the user and an identification of the appliance 220 being accessed. In 518, the appliance 220 can be configured to receive a verification response 260 from the authentication server 245. For example the access control module 235 can receive a verification response 260 that includes an indication that the user is authorized to access the appliance 220 and the level of access the user has to access the appliance 220.

In 520, the appliance 220 grants access to the appliance 220 based on the verification response 260. For example, the access control module 235 can receive the verification response 260 and grant or deny access based on the verification response 260. If access is granted, the access control module 235 can undertake the necessary steps to grant access to the user. For example, the access control module 235 can communicate with the appropriate components of the appliance 220 to remove any security and grant access to the components associated with the user's level of access.

Then, in 522, the process can end, but the process can return to any point and repeat.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:

determining, by a processor of an originator of an appliance comprising components, that the appliance is to be instantiated in a cloud computing system comprising resources that are not controlled by the originator of the appliance;

securing, by the processor of the originator, access to the components of the appliance by applying a secure rights application to the appliance, the secure rights application executing on the processor of the originator, the securing further comprising:

generating, by the secure rights application, a security container to install in the appliance, the security container representing security protocols applied to the components and access control protocols and rights management protocols for accessing the components;

generating, by the secure rights application, an access control module within the security container, the access control module to limit an ability of a set of users of the appliance to access and modify the components;

setting, by the secure right application, an access level to apply to each user of the set of users in the access control module, the access level representing an ability of each user to access and modify the components;

setting, by the secure rights application, a limited access level to apply to the resources of the cloud computing system, the limited access level comprising permission to configure applications and an operating system (OS) of the appliance to operate correctly in the cloud computing system while limiting access to other components of the appliance, wherein the OS of the appliance provides an execution platform for the components; and configuring the access control module with a location of an access record storing the access level applying to the set of users and the limited access level applying to the resources of the cloud computing system, wherein the access record is maintained by an authentication server separate from the appliance and the cloud computing system, and wherein the authentication server is to verify authentication information of an accessing user of the appliance and to determine access to the appliance in view of the access record and the verification of the authentication information; and providing, by the processor of the originator, the appliance to the cloud computing environment for use in the cloud computing system with the secured access to the components to limit access to the components of the appliance by the resources of the cloud computing system while maintaining functionality of the appliance in the cloud computing system.

2. The method of claim 1, wherein securing access to the components of the appliance, comprises:

applying an authentication scheme to the components of the appliance; and applying the access control module to the appliance.

3. The method of claim 1 further comprising configuring the access control module to communicate securely with an authentication server maintaining the access record.

4. The method of claim 3, wherein the secure rights application comprises the authentication server.

5. A system comprising:

a memory;

a processor communicably coupled to the memory, the processor to manage an origination and a provisioning of an appliance that is to be instantiated in a cloud computing system comprising resources that are not controlled by an originator of the appliance, the appliance comprising components;

a network interface device communicably coupled to the memory and the processor, the network interface device to communicably couple the system to a cloud computing system; and a secure rights application executable from the memory by the processor, and the secure rights application to communicate with the network interface device and to secure access to the components of the appliance by:

generating a security container to install in the appliance, the security container representing security protocols applied to the components and access control protocols and rights management protocols for accessing the components;

generating an access control module within the security container, the access control module to limit an ability of a set of users of the appliance to access and modify the components;

set an access level to apply to each user of the set of users in the access control module, the access level representing an ability of each user to access and modify the components;

set a limited access level to apply to the resources of the cloud computing system, the limited access level comprising permission to configure applications and an operating system (OS) of the appliance to operate correctly in the cloud computing system while limiting access to other components of the appliance, wherein the OS of the appliance provides an execution platform for the components; and configure the access control module with a location of an access record storing the access level applying to the set of users and the limited access level applying to the resources of the cloud computing system, wherein the access record is maintained by an authentication server separate from the appliance and the cloud computing system, and wherein the authentication server is to verify authentication information of an accessing user of the appliance and to determine access to the appliance in view of the access record and the verification of the authentication information; and the processor further to provide the appliance to the cloud computing environment for use in the cloud computing system with the secured access to the components to limit access to the components of the appliance by the resources of the cloud computing system while maintaining functionality of the appliance in the cloud computing system.

6. The system of claim 5, wherein securing access to the components of the appliance, comprises:

applying an authentication scheme to the components of the appliance; and applying the access control module to the appliance.

7. The system of claim 5, wherein the secure rights application further to configure the access control module to communicate securely with an authentication server maintaining the access record.

8. The system of claim 7, wherein the secure rights application comprises the authentication server.

9. A non-transitory computer readable storage medium comprising instructions that when accessed by a processor, cause the processor to:

determine, by the processor of a processor of an originator of an appliance comprising components, that the appliance is to be instantiated in a cloud computing system comprising resources that are not controlled by the originator of the appliance;

secure, by the processor of the originator, access to the components of the appliance by applying a secure rights application to the appliance, the secure rights application executing on the processor of the originator, the securing further comprising the processor to:

generate, by the secure rights application, a security container to install in the appliance, the security container representing security protocols applied to the components and access control protocols and rights management protocols for accessing the components;

generate, by the secure rights application, an access control module within the security container, the access control module to limit an ability of a set of users of the appliance to access and modify the components;

set, by the secure right application, an access level to apply to each user of the set of users in the access control module, the access level representing an ability of each user to access and modify the components;

set, by the secure rights application, a limited access level to apply to the resources of the cloud computing system, the limited access level comprising permission to configure applications and an operating system (OS) of the appliance to operate correctly in the cloud computing system while limiting access to other components of the appliance, wherein the OS of the appliance provides an execution platform for the components; and configure the access control module with a location of an access record storing the access level applying to the set of users and the limited access level applying to the resources of the cloud computing system, wherein the access record is maintained by an authentication server separate from the appliance and the cloud computing system, and wherein the authentication server is to verify authentication information of an accessing user of the appliance and to determine access to the appliance in view of the access record and the verification of the authentication information; and provide, by the processor of the originator, the appliance to the cloud computing environment for use in the cloud computing system with the secured access to the components to limit access to the components of the appliance by the resources of the cloud computing system while maintaining functionality of the appliance in the cloud computing system.

10. The non-transitory computer readable storage medium of claim 9, wherein the processor further to configure the access module to communicate securely with an authentication server maintaining the access record.

11. The non-transitory computer readable storage medium of claim 10, wherein the secure rights application comprises the authentication server.

12. The non-transitory computer readable storage medium of claim 9, wherein securing access to the components of the appliance further comprises the processor to:
- apply an authentication scheme to the components of the appliance; and
- apply an access control module to the appliance.

* * * * *